Patented Oct. 13, 1931

1,826,882

UNITED STATES PATENT OFFICE

CHARLES T. HENNIG, OF CLEVELAND, OHIO

METHOD OF PURIFYING STEEL IN THE OPEN HEARTH PROCESS

No Drawing.     Application filed August 16, 1929. Serial No. 386,491.

This invention relates to the manufacture of steel, and especially to steel made by the basic open hearth process, and is an improvement in the invention described and claimed in my Patent No. 1,717,153, granted June 11, 1929.

It is one of the objects of the invention to provide a reliable method of treating the metal so as to obtain the desired results with uniformity and certainty.

As is well known, the metal, in the open hearth furnace, contains a relatively large amount of iron oxide, manganese oxide, silicates, and other impurities either in the dissolved condition or in suspension, as well as a relatively large amount of gas. The cold metal that is usually charged into the open hearth furnace contains a considerable amount of surface impurities, such as rust or iron oxide, and when the metal melts, in the open hearth process, as heretofore conducted, these impurities become dissolved or suspended in the bath.

It is a further object of my invention to provide an improved method of procedure whereby the oxides, silicates and other impurities on or in the cold metal will be washed therefrom and largely prevented from becoming dissolved or otherwise held in the bath.

It is a further object of my invention to provide an improved method of procedure whereby the oxides, silicates, and other impurities in the hot or cold metal, as charged, are removed to a large extent during the melting down period of the heat.

In practicing my invention, I first introduce the usual lime charge into the furnace, and either introduce along with this lime charge or spread on top of it a purifying material which accomplishes the purposes above set forth. To this end, the purifying material may be mixed with the lime in charging-boxes or, in cases where the lime is charged first, the purifying material may be thrown in and spread over the lime by means of a shovel.

The purifying material which I use is substantially the same as that disclosed in my application No. 301,434, filed August 22, 1928, and consists essentially of a mixture of commercial soda ash and a controlling substance therefor, such as manganese dioxide. The purifier may vary as to its composition but, in addition to the materials specified, contains some lime, to raise the melting point of the soda ash, and I have found that the following composition is entirely satisfactory:

Commercial soda ash ($Na_2CO_3$) --- 80%
Calcium oxide (CaO) as limestone -- 3 to 4%
Manganese dioxide ($MnO_2$) ------ ¼ to 1%
Chlorine, as calcium chloride ($CaCl_2$) or sodium chloride (NaCl) - ½%

The balance of the material of the briquet consists of a binder, which amounts to about 10%, some water of crystallization, and a small amount of other impurities in the form of silica, magnesia, iron and alumina. The binder is preferably glucose or molasses refuse, and the above-mentioned materials are mixed together and run through a briqueting machine to produce briquets of any desired size but which I prefer to make of such size that they will average about five briquets per pound of weight. From 2 to 4 pounds of the purifier per ton of metal charged will give satisfactory results.

In accordance with the usual practice, I charge over the lime and the briquets the usual layer of iron ore and on the iron ore charge the scrap metal and cast iron. In cases where an initial charge of iron ore is unnecessary because of the nature of the metal charged, the ore may be omitted and the cold metal may be charged on the bed made as above described. In the early stages of the heat, the relatively low fusion point of the purifying material causes this material to be melted first, and as the operation proceeds the metal settles and the molten purifier rises with the slag, and the metal is washed thereby, and thus freed from its oxides and other impurities which combine with the purifier to form the slag. As the heat progresses and before the metal starts to melt, the carbon dioxide is driven off from the soda and a highly liquid basic slag is produced. As the molten metal accumulates on the bed of the furnace, the impurities therein, on account of their lighter specific gravity, rise to the surface and combine with the slag and are held by it. As the molten metal accumulates, the level of the slag gradually rises and washes the surfaces of the unmelted metal until all of the metal has been reduced to the molten condition. Thereafter, the boiling of the bath brings the gases and the impurities to the surface, the gases being permitted to pass through the slag on account of its fluidity and the impurities combining with the slag and being held thereby. The boiling of the metal produces little fountains or geysers throughout the surface of the bath which carry the metal through the slag and result in a further washing of the metal so that by the time the heat is ready to be tapped the metal will be thoroughly degasified and sustantially free from oxides and other impurities.

The procedure from this point on, so far as recarbonizing and adding ferrosilicon, spiegel or alloys are concerned, may follow the usual practice.

Having thus described my invention, I claim:

The hereindescribed method of purifying steel in the course of its manufacture by the basic open-hearth process which consists in adding to the lime charge, prior to the introduction of the metal into the open-hearth furnace, a deoxidizing material in the form of an intimate mixture comprising commercial soda ash, a calcium compound and manganese dioxide and wherein the soda ash is over three-fourths of the mixture, the calcium compound has a calcium oxide content that is an effective amount, up to ten per cent, to substantially raise the melting point of the soda ash, and the manganese dioxide is an effective amount, up to five per cent, for controlling the action of the soda ash, and thereby forming an initial slag having a relatively high sodium content to react with the metal from the beginning of the heat.

In testimony whereof, I hereunto affix my signature.

CHARLES T. HENNIG.